(12) United States Patent
Arakawa

(10) Patent No.: US 8,578,092 B2
(45) Date of Patent: Nov. 5, 2013

(54) METHOD AND APPARATUS TO SUPPORT DETERMINING STORAGE AREA UNIT SIZE

(75) Inventor: Hiroshi Arakawa, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 588 days.

(21) Appl. No.: 12/692,839

(22) Filed: Jan. 25, 2010

(65) Prior Publication Data

US 2011/0185140 A1 Jul. 28, 2011

(51) Int. Cl.
*G06F 12/00* (2006.01)
(52) U.S. Cl.
USPC .................................. 711/114; 711/E12.069
(58) Field of Classification Search
USPC .......................................................... 711/114
See application file for complete search history.

(56) References Cited

U.S. PATENT DOCUMENTS

| 2004/0162958 A1 | 8/2004 | Kano et al. | |
| 2009/0210462 A1* | 8/2009 | Arakawa et al. | 707/204 |
| 2010/0235597 A1* | 9/2010 | Arakawa | 711/163 |

* cited by examiner

*Primary Examiner* — Reginald Bragdon
*Assistant Examiner* — Hamdy S Ahmed
(74) *Attorney, Agent, or Firm* — Mattingly & Malur, PC

(57) ABSTRACT

An information system comprises a host computer; a management computer; and a storage system including a storage controller and a plurality of storage volumes, the storage system configured to provide thin provisioned volumes from the plurality of storage volumes to the host computer for input/output. Each thin provisioned volume includes a plurality of segments which are provided by chunks of the storage volumes in the storage system. The storage controller is configured to assign a chunk to a segment on demand, analyze effectiveness of different chunk sizes for a chunk to be assigned to a segment and provide a report of the analyzed effectiveness to the management computer, and determine a size of a chunk to be assigned to a segment based on input from the management computer after the management computer receives the report of analyzed effectiveness.

20 Claims, 14 Drawing Sheets

| TPV ID | Segment ID | Assigned | Pool Volume ID | Chunk ID |
|---|---|---|---|---|
| 0 | 0 | Yes | 12 | 56 |
|  | 1 | No | - | - |
|  | 2 | Yes | 230 | 29 |
|  | : |  |  |  |
| 1 | 0 | Yes | 31 | 77 |
|  | 1 | Yes | 22 | 90 |
|  | 2 | No | - | - |
|  | : |  |  |  |
| : |  |  |  |  |

Fig. 4

| Pool Volume ID | Chunk Size | Chunk ID | Usage | TPV ID | Segment ID |
|---|---|---|---|---|---|
| 0 | 1MB | 0 | In Use | 14 | 35 |
|  |  | 1 | Free | - | - |
|  |  | 2 | In Use | 53 | 46 |
|  |  | : |  |  |  |
|  |  | 4096 | Free | - | - |
|  |  | 4097 | Free | - | - |
|  |  | : |  |  |  |
|  | : |  |  |  |  |
| 100 | 4MB | 0 | In Use | 24 | 54 |
|  |  | 1 | In Use | 32 | 74 |
|  |  | 2 | Free | - | - |
|  |  | : |  |  |  |
|  | : |  |  |  |  |

Fig. 5

| Volume ID | Type | Size | Conventional Volume ID | Disk ID | Start Address | TPV ID | Record Access Information | Segment Size |
|---|---|---|---|---|---|---|---|---|
| 0 | Conventional | 100 GB | 17 | 17 | 0 | - | Yes | - |
| 1 | Conventional | 200 GB | 45 | 23 | 0 | - | Yes | - |
| 2 | TPV | 100 GB | - | - | - | 12 | Yes | 16 MB |
| 3 | TPV | 200 GB | - | - | - | 32 | Yes | 4 MB |
| 4 | Conventional | 150 GB | 22 | 11 | 0 | - | No | - |
| : | | | | | | | | |

| TPV ID | Read / Write | Access rate per unit time | Average access length | Frequency of transcending segment boundary ||||
|---|---|---|---|---|---|---|---|
| | | | | 1 MB boundary | 2 MB boundary | ... | 128 MB boundary |
| 0 | Read | 4023 | 4096 | 2708 | 1324 | | 23 |
| 0 | Write | 3958 | 4096 | 2649 | 1409 | | 17 |
| 1 | Read | 370 | 1048576 | 363032 | 180283 | | 46102 |
| 1 | Write | 254 | 1048576 | 240898 | 122034 | | 31527 |
| : | | | | | | | |

| TPV ID | Segment ID of minimum size segment | Accessed |
|---|---|---|
| 0 | 0 | Yes |
| 0 | 1 | No |
| | : | |
| : | : | |

| TPV ID | Accessed area |
|---|---|
| 0 | 1000-9191, 13288-21479 |
| 1 | 0-101572863 |
| : | |

Fig. 12

METHOD AND APPARATUS TO SUPPORT DETERMINING STORAGE AREA UNIT SIZE

BACKGROUND OF THE INVENTION

The present invention relates generally to storage systems and, more particularly, to a method and an apparatus to support determining the unit size of storage area.

Recently, the use of thin provisioning has been popularized for storage systems. The thin provisioning technique can realize efficient use of storage area as well as reduction of management cost relating to the storage systems. With the thin provisioning, a storage system provides virtual volumes as storage areas to store data for computers. The storage system allocates and assigns physical areas to only locations having write access of the computers. Consequently, the total amount of used physical areas can be smaller than the total amount of virtual areas shown to the computers. The thin provisioning technique is disclosed, for example, in US2004/0162958, the entire disclosure of which is incorporated herein by reference.

In the above allocation and assignment, a "page" or a "chunk" is used as a unit for the allocation and assignment of storage area. Choosing the size of the chunk brings a trade-off between access performance and efficiency of the physical area usage. For example, a small size (i.e., small unit) provides high efficiency because any unused part of the assigned chunk will be relatively small, while the performance for sequential access is smaller than the performance involving a large size chunk because the frequency and total overhead of solving relation between the virtual area and the physical area can be large in the case of the small unit. Therefore the size of chunk should be selected with consideration for the trade-off regarding expected performance and expected efficiency. The performance and efficiency depend on usage (i.e., access pattern) of data stored in the volume. The usage can be different for each data (i.e., each location) in the volume.

BRIEF SUMMARY OF THE INVENTION

Exemplary embodiments of the invention provide a method and an apparatus to support determining the unit size of storage area. As mentioned above, the chunk size should be selected according to the tendency of usage of data from the trade-off point of view. Thus, in order to support determining the appropriate chunk size, a method and an apparatus to estimate the effectiveness of chunk size from the viewpoints such as area usage efficiency and performance is necessary. With the present invention, a storage system that provides thin provisioned volumes (TPVs) to the host computers has the capability to monitor the access characteristics of volumes, a capability to evaluate the effectiveness of various chunk sizes by referring to the monitored access characteristics, and the capability to provide or present the evaluation to a user so that the user can choose an appropriate chunk size for each volume. According to the decision regarding chunk size for a volume, the user can instruct to apply the selected chunk size of the volume to the storage system. The storage system applies the chunk size of the volume in response to the user's instruction. In one embodiment, the parameters regarding read/write access are recorded as the access characteristics mentioned above. With regard to applying the selected chunk size, in one embodiment, the storage system changes the chunk size of one TPV from the current chunk size to the specified chunk size. In another embodiment, the storage system can adopt the selected chunk size for the new TPV in the migration of data from a conventional (not thin provisioned) volume to the TPV as well as in the conversion between different TPVs.

In accordance with an aspect of the present invention, an information system comprises a host computer; a management computer; and a storage system coupled to the host computer and the management computer, the storage system including a storage controller and a plurality of storage volumes, the storage system being configured to provide thin provisioned volumes from the plurality of storage volumes to the host computer for input/output (I/O). Each thin provisioned volume includes a plurality of segments which are provided by chunks of the storage volumes in the storage system. The storage controller is configured to assign a chunk to a segment on demand. The storage controller is configured to analyze effectiveness of different chunk sizes for a chunk to be assigned to a segment and provide a report of the analyzed effectiveness to the management computer. The storage controller is configured to determine a size of a chunk to be assigned to a segment based on input from the management computer after the management computer receives the report of analyzed effectiveness.

In some embodiments, the input from the management computer to the storage controller is given by a user who determines whether to change a chunk size based on the report of analyzed effectiveness. The storage controller is configured to analyze effectiveness of different chunk sizes based on monitoring accesses to the storage volumes and updating access information and used area information for the storage volumes, the access information maintaining information regarding access characteristics of the storage volumes, the used area information identifying used areas and unused areas of the storage volumes. The access information includes one or more of: frequency of transcending segment boundary in per unit time for various segment sizes; access rate per unit time for each read I/O; access rate per unit time for each write I/O; average access length for each read I/O; or average access length for each write I/O. The storage controller is configured to analyze effectiveness of different chunk sizes based on used area information for the storage volumes, the used area information identifying used areas and unused areas of the storage volumes. The storage controller is configured to allocate a chunk from the storage volumes to a volume to receive write data in response to a write request so that the allocated chunk is a continuous physical area in the storage volumes.

In specific embodiments, the storage controller, in response to an instruction to change the chunk size to a new chunk size for a storage volume: checks mapping information between thin provisioned volumes and corresponding chunks to determine whether there are one or more chunks to be copied between chunks of different sizes to accomplish changing the chunk size; and if yes, then, secures one or more new chunks of the new chunk size; copies data in old chunks to the new chunks; and updates the mapping information.

In some embodiments, the storage controller, in response to an instruction to change the chunk size to a new chunk size for a volume: obtains a new thin provisioned volume having segments with corresponding chunks of a chunk size which is same as the new chunk size; reads data from the volume specified in the instruction; writes the read data to the new thin provisioned volume with maintaining correspondence; updates volume information to change a relation between volumes and volume identifiers by replacing the volume specified in the instruction with the new thin provisioned volume; and if the volume specified in the instruction is a thin provisioned volume, releases the volume by updating mapping information between thin provisioned volumes and corresponding chunks and pool information for managing whether a chunk is used or not.

In accordance with another aspect of the invention, a method of managing sizes of the chunks comprises analyzing effectiveness of different chunk sizes for a chunk to be assigned to a segment and providing a report of the analyzed effectiveness to the management computer; and determining a size of a chunk to be assigned to a segment based on input from the management computer after the management computer receives the report of analyzed effectiveness.

Another aspect of the invention is directed to a computer-readable storage medium storing a plurality of instructions for controlling a data processor to manage sizes of chunks in the information system. The plurality of instructions comprise instructions that cause the data processor to analyze effectiveness of different chunk sizes for a chunk to be assigned to a segment and providing a report of the analyzed effectiveness to the management computer; and instructions that cause the data processor to determine a size of a chunk to be assigned to a segment based on input from the management computer after the management computer receives the report of analyzed effectiveness.

These and other features and advantages of the present invention will become apparent to those of ordinary skill in the art in view of the following detailed description of the specific embodiments.

BRIEF DESCRIPTION OF THE DRAWINGS

FIG. 4 shows an example of the mapping information.

FIG. 5 shows an example of the pool information.

FIG. 6 shows an example of the volume information.

FIG. 10 illustrates an example of the access information.

FIG. 11 illustrates an example of the used area information.

FIG. 12 illustrates another example of the used area information.

DETAILED DESCRIPTION OF THE INVENTION

Figure 1:
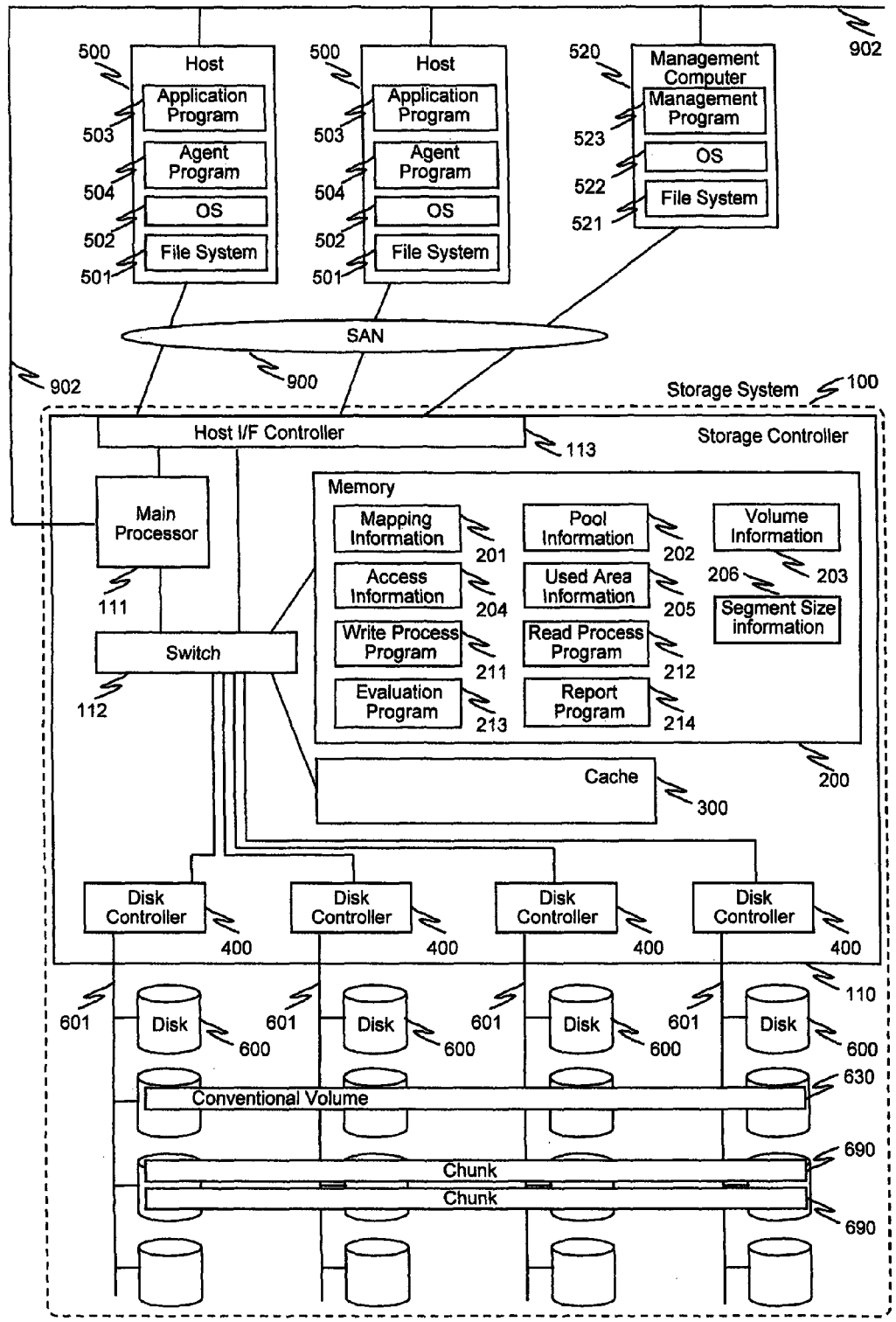
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for determining the unit size of storage area in a storage system that provides thin provisioned volumes, from viewpoints such as area usage efficiency and performance. The invention enables the user to determine the appropriate chunk size for each data.

A. System Configuration

FIG. 1 illustrates an example of a hardware configuration of an information system in which the method and apparatus of the invention may be applied. A storage system includes a storage controller 110, a main processor 111, a switch 112, a host interface controller 113, a memory 200, a cache 300, disk controllers 400, a plurality of disks 600, and backend paths 601 (e.g., Fibre Channel, SATA, SAS, iSCSI(IP)). The main processor 111 performs various processes regarding the storage controller 100. The main processor 111 and other components use the following information stored in the memory 200: mapping information 210, pool information 202, volume information 203, access information 204, used area information 205, and segment size information 206. The main processor 111 carries out the various processes by executing the following programs stored in the memory 200: write process program 211, read process program 212, evaluation program 213, and report program 214. A plurality of volumes (e.g., logical units) provided by the storage system 100 are produced from a collection of areas in HDDs (Hard Disk Drives). They may be protected by storing parity code (i.e., by RAID configuration) or mirroring.

At least one host 500 and a management computer 520 are connected to the host interface 113 of the storage system 100 via the SAN (Storage Area Network) 900 (e.g., Fibre Channel, Fibre Channel over Ethernet, iSCSI(IP), etc.). The host 500, management computer 520, and storage controller 110 are connected to each other via the LAN (Local Area Network) 902 (e.g., IP network). The host 500 has a file system 501, an operating system OS 502, an application program 503, and an agent program 504. To execute these programs, the host 500 also has resources such as processor, memory, storage devices not shown in FIG. 1. The management computer 520 has a file system 521, an OS 522, and a management program 523. To execute these programs, the host 500 also has resources such as processor, memory, storage devices not shown in FIG. 1.

B. Overview of Method to Provide Volumes

Figure 2:
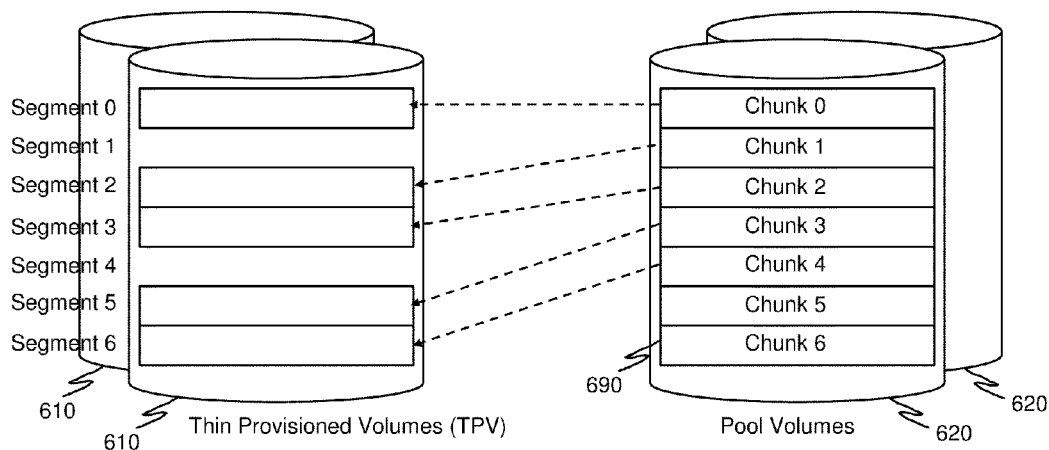
FIG. 2 is a schematic diagram illustrating the structure and method to provide thin provisioning volumes.
Figure 3:
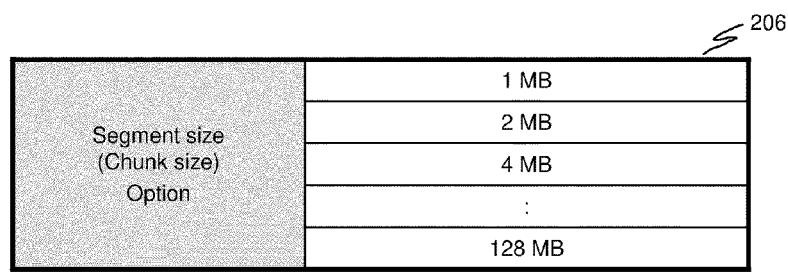
FIG. 3 shows an example of the segment size information.

As described below, the storage system 100 provides TPVs and conventional (i.e., not thin provisioned) volumes. FIG. 2 is a schematic diagram illustrating the structure and method to provide TPVs. The storage system 100 has pool volumes 620 and divides the pool volumes 620 into a number of areas called chunks 690. The storage system 100 assigns a chunk 690 to a segment of a virtual volume, namely, a thin provisioning volume (TPV) on a write access. In other words, a physical storage area is assigned on demand. In FIG. 2, a TPV is constituted by multiple segments virtually, and a chunk 690 is allocated from the pool volume 620 and assigned to a segment (i.e., a fixed length area (page) of TPV). For example, chunk 4 is assigned to segment 6 in FIG. 2. That is, a TPV is a page-based volume. The size of the segments (i.e., the size of assigned chunks) can be different for each volume. The segment size information 206 maintains options for the segment size. FIG. 3 shows an example of the segment size information 206.

To achieve thin provisioning, the storage controller 110 uses the mapping information 201 and pool information 202. FIG. 4 shows an example of the mapping information 201 in the form of a table. The table presents columns of TPV ID, Segment ID, Assigned, Pool Volume ID, and Chunk ID. This information maintains mapping between chunks and segments of each volume. The status of assignment is "No" if no chunk is assigned to the segment. This information can be constructed as a list or directory of each element for faster search.

FIG. 5 shows an example of the pool information 202 in the form of a table. The table presents columns of Pool Volume ID, Chunk Size, Chunk ID, Usage, TPV ID, and Segment ID. This information manages whether a chunk is used or not. By using this information, the storage controller 110 is able to find free (unused) chunks in a write process described below. This information also can be constructed as a list or directory of each element to search for a free chunk quickly.

The storage system 100 also provides conventional volumes. The storage controller 110 allocates storage areas to the whole area of a conventional volume 630 at creation of the volume. In order to manage the storage area for conventional volumes, the storage controller 110 uses the volume information 203.

FIG. 6 shows an example of the volume information 203 in the form of a table. The table presents columns of Volume ID, Type, Size, Conventional Volume ID, Disk ID, Start Address, TPV ID, Record Access Information, and Segment Size. The volume information 203 provides Type (i.e., conventional or TPV), Size, and public Volume ID for each volume. This volume ID is used to identify the volume by other computers including the host computers 500 while the conventional volume ID and TPV ID are internal IDs basically. Because the volume information 203 has volume size (area size) and location of area in the HDD 600 (disk ID and start address of the area in the disk) for conventional volumes, the storage controller 110 can manage and provide conventional volumes by using this information. The volume information 203 also maintains the relation (mapping) between public volume ID and conventional volume ID.

The volume information 203 is also used to supply TPVs as data storage volumes provided by the storage system 100 to the host 500, by referring to the TPV ID. In other words, the volume information 203 maintains the relation (mapping) between the public volume ID and TPV ID. The volume information 203 also includes information regarding the segment size of each TPV. By referring to options indicated by the segment size information 206 of FIG. 2, the segment size is registered by the user via the host 500, the management computer 520, and/or the management terminal of the storage system 100. In addition, the volume information 203 has the record access information flag which is described later. The initial value of the record access information flag is "Yes."

C. Overview of Write Process

Figure 7:
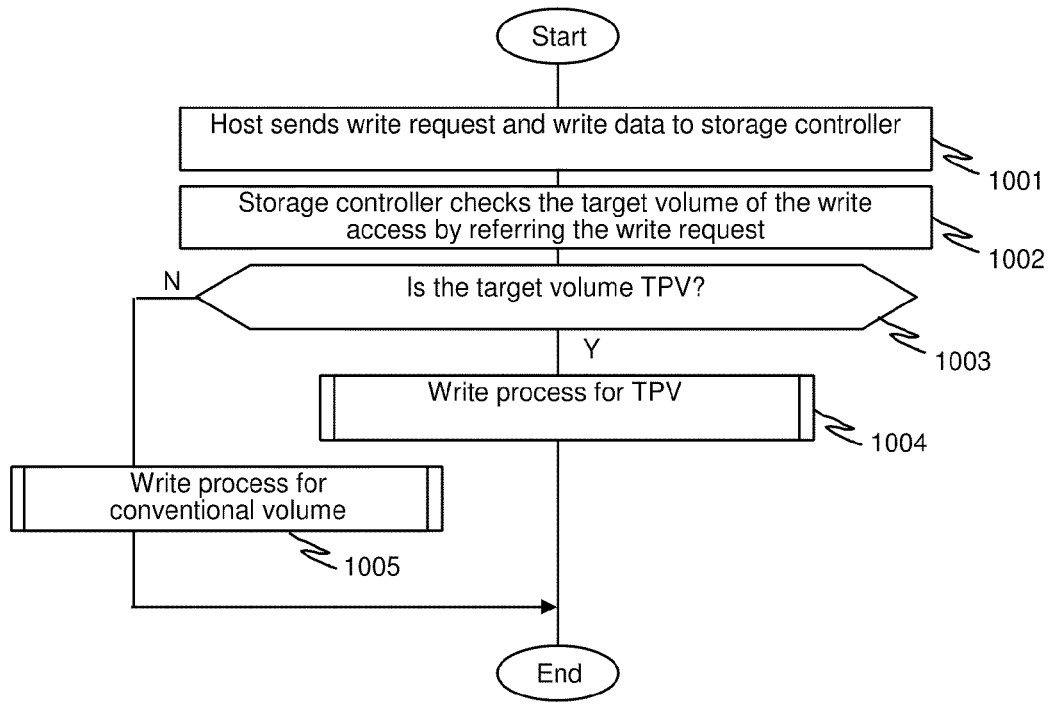
FIG. 7 is an example of a flow diagram illustrating an overview of a process for a write request from the host computer.

FIG. 7 is an example of a flow diagram illustrating an overview of a process for a write request from the host computer 500. At step 1001, the host 500 issues a write request and transfers write data to the storage controller 110. At step 1002, the storage controller 110 checks the target volume of the write access by referring to the write request. At step 1003, if the type of the target volume is TPV, the storage controller 110 performs a write process for TPV (step 1004). Otherwise, the storage controller 110 performs a write process for conventional volume (step 1005). Each type of the write processes is described in detail below.

D. Overview of Read Process

Figure 8:
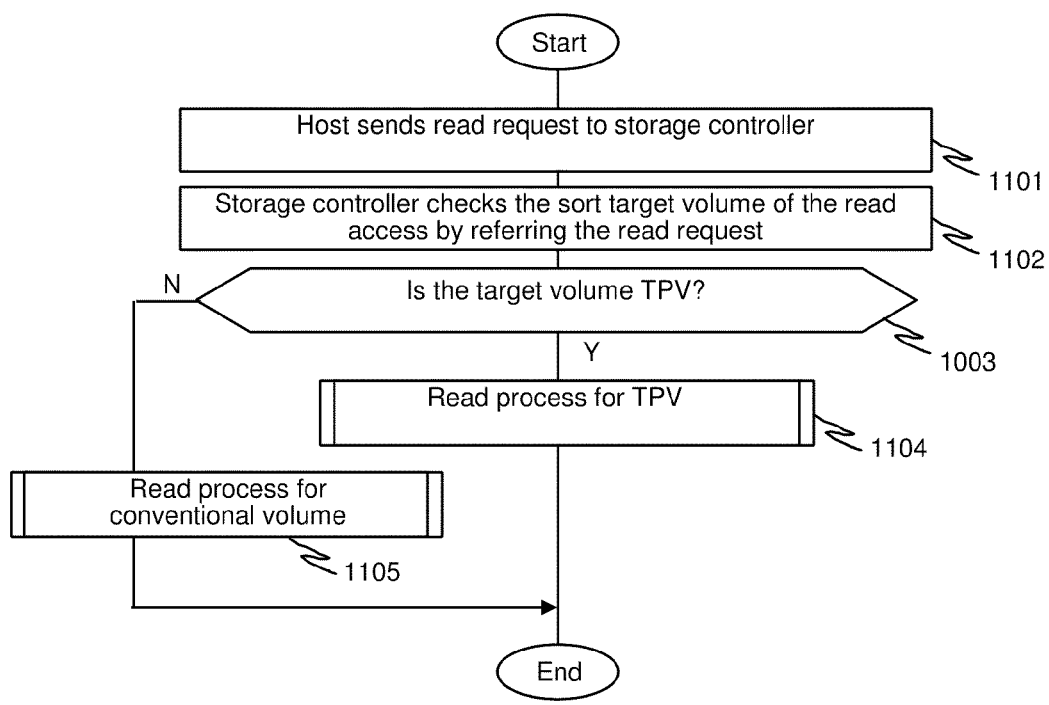
FIG. 8 is an example of a flow diagram illustrating an overview of a process for a read request from host computer.

FIG. 8 is an example of a flow diagram illustrating an overview of a process for a read request from host computer 500. At step 1101, the host 500 issues a read request and transfers it to the storage controller 110. At step 1102, the storage controller 110 checks the target volume of the read access by referring to the read request. At step 1103, if the type of the target volume is TPV, the storage controller 110 performs a read process for TPV (step 1104). Otherwise, the storage controller 110 performs a read process for conventional volume (step 1105). Each type of the read processes is described in detail below.

E. Write Process for TPV

Figure 9:
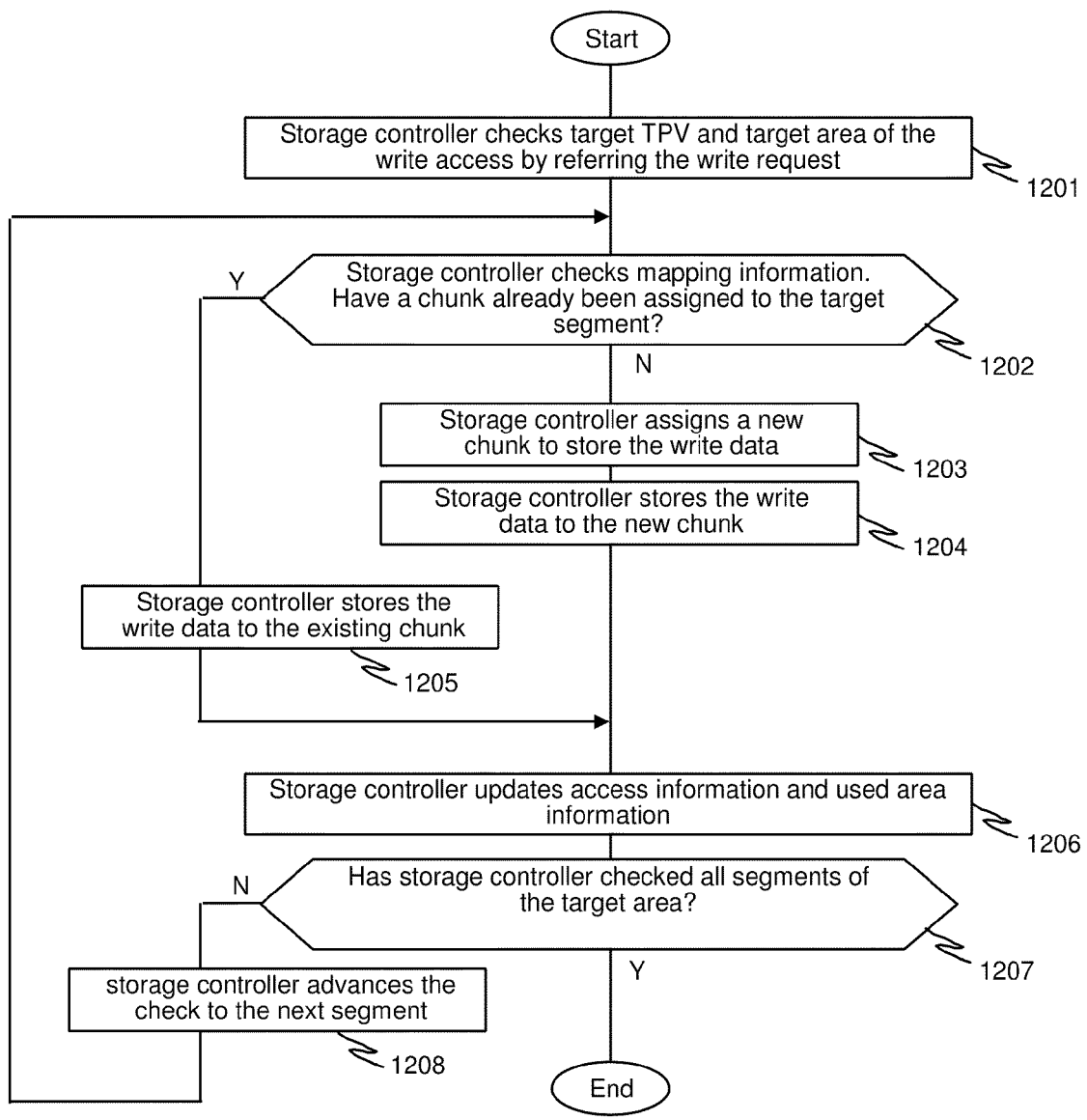
FIG. 9 is an example of a flow diagram illustrating a write process for thin provisioning volume.

FIG. 9 is an example of a flow diagram illustrating a write process for TPV 610. At step 1201, the storage controller 110 checks the target TPV 610 and the target area of the write access by referring to the write request. At step 1202, the storage controller 110 checks the mapping information 201 for a segment in the target area. If a chunk has already been assigned to the segment, the process proceeds to step 1205. If not, the process proceeds to step 1203. At step 1203, the storage controller 110 assigns a new chunk to store the write data. To do this, the storage controller 110 updates the mapping information 201 and pool information 202. By using the pool information 202, the storage controller 110 finds the new chunk from the pool volumes 620. At step 1204, the storage controller 110 stores the write data to the new chunk. Then the process proceeds from step 1204 to step 1206. At step 1205, the storage controller 110 stores the write data to the existing chunk. The process also proceeds to step 1206 from step 1205. At step 1206, the storage controller 110 updates the access information 204 and used area information 205. At step 1207, if the storage controller 110 has checked all segments of the target area, the process ends. If not, the storage controller 110 advances the check to the next segment (step 1208).

When the storage controller 110 allocates a chunk for storing the write data, it selects a continuous physical area for the chunk; otherwise, the storage controller 110 would have to interpret the beginning of the heading, thereby delaying the access speed. This explains why it is generally not effective to simply allocate different numbers of chunks (which typically will not constitute a continuous physical area) to a page instead of changing the size of the chunk (which will be a continuous physical area).

FIG. 10 illustrates an example of the access information 204 in the form of a table. The table presents columns of TPV ID, Read/Write, Access rate per unit time, Average access length, and Frequency of transcending segment boundary (e.g., 1 MB boundary increasing incrementally to 128 MB boundary). The access information 204 maintains information regarding access characteristics including the frequency of transcending segment boundary in per unit time for various segment sizes as well as access rate per unit time and average access length for each of read and write. The assumed segment size for recording transcending boundary is supposedly based on the segment size information 206. The information regarding the average access length may be initialized at a certain interval.

FIG. 11 and FIG. 12 illustrate examples of the used area information 205. The used area information 205 maintains information to identify used area and unused area. In the example shown in FIG. 11, the area in the TPV is divided by the minimum segment size (e.g., 1 MB) indicated by the segment size information 206 regardless of the actual segment size and occurrence of access for each "minimum segment" is recorded. In the example, "Yes" means occurrence of access (i.e., used area) and "No" means unused area. In the other example shown in FIG. 12, the accessed area (i.e., used area) in bytes is recorded.

F. Read Process for TPV

Figure 13:
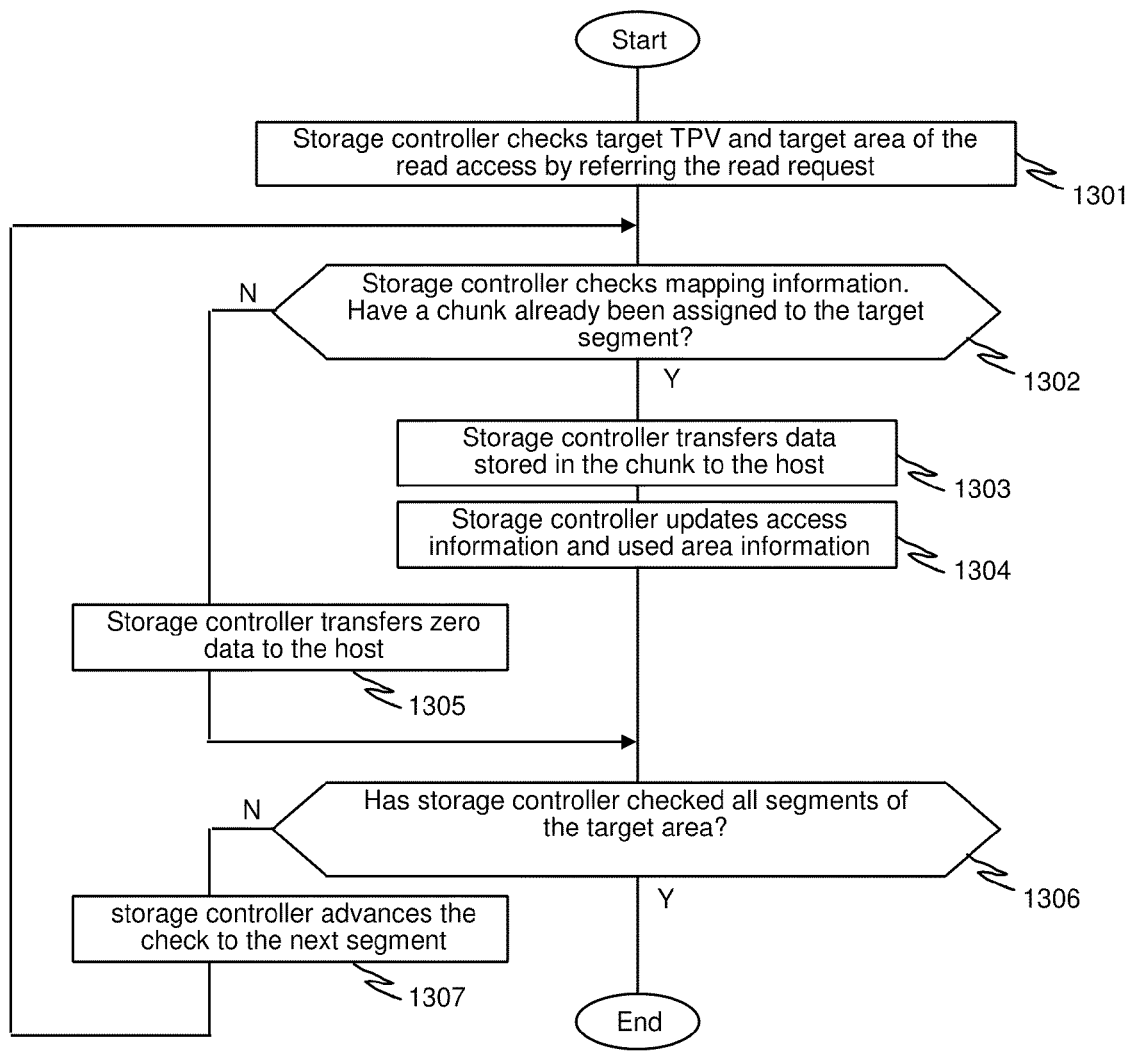
FIG. 13 is an example of a flow diagram illustrating a read process for thin provisioning volume.

FIG. 13 is an example of a flow diagram illustrating a read process for TPV 610. At step 1301, the storage controller 110 checks the target TPV 610 and the target area of the read access by referring to the read request. At step 1302, the storage controller 110 checks the mapping information 201 for a segment in the target area. If a chunk has already been assigned to the segment, the process proceeds to step 1303. If not, the process proceeds to step 1305. At step 1303, the storage controller 110 transfers data stored in the chunk to the host 500. At step 1304, the storage controller 110 updates the access information 204 and the used area information 205. At step 1305, the storage controller 110 sends data of zero (0) to the host 500. After step 1304 or step 1305, at step 1306, if the storage controller 110 has checked all segments of the target area, the process ends. If not, the storage controller 110 advances the check to the next segment (step 1307).

G. Write Process for Conventional Volume

With this invention, the access information 204 and used area information 205 are recorded (i.e., the access characteristics are monitored) also for the conventional volumes 630 if the flag of the record access information in the volume information 203 is "Yes." This flag may be set and changed for conventional volume 630 by the user via the host 500, management computer 520, and/or management terminal of the storage system 100. The default value of this flag is "Yes."

Figure 14:
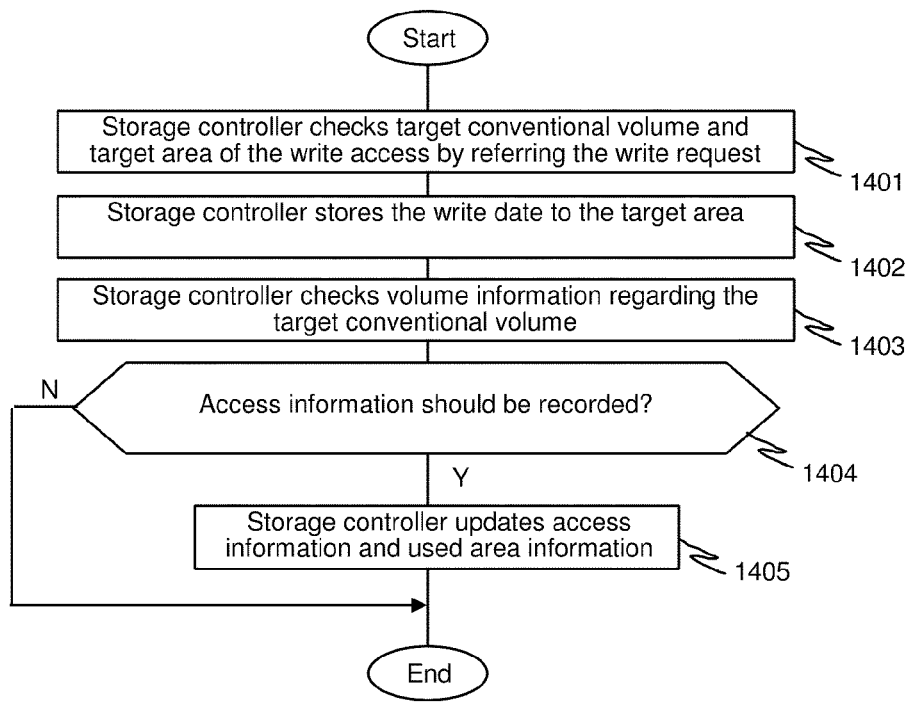
FIG. 14 is an example of a flow diagram illustrating a write process for conventional volume.

FIG. 14 is an example of a flow diagram illustrating a write process for conventional volume 630. At step 1401, the storage controller 110 checks the target conventional volume 630 and the target area of the write access by referring to the write request. At step 1402, the storage controller 110 stores the write data to the target area of the write access. At step 1403 and step 1404, the storage controller 110 checks the record access information flag in the volume information 203. If the flag is "Yes," the process proceeds to step 1405. If not, the process ends. At step 1405, the storage controller 110 updates the access information 204 and used area information 205.

The access information 204 and used area information 205 for conventional volume are the same as access information 204 and used area information 205 for TPV except for having conventional volume ID instead of TPV ID.

H. Read Process for Conventional Volume

Figure 15:
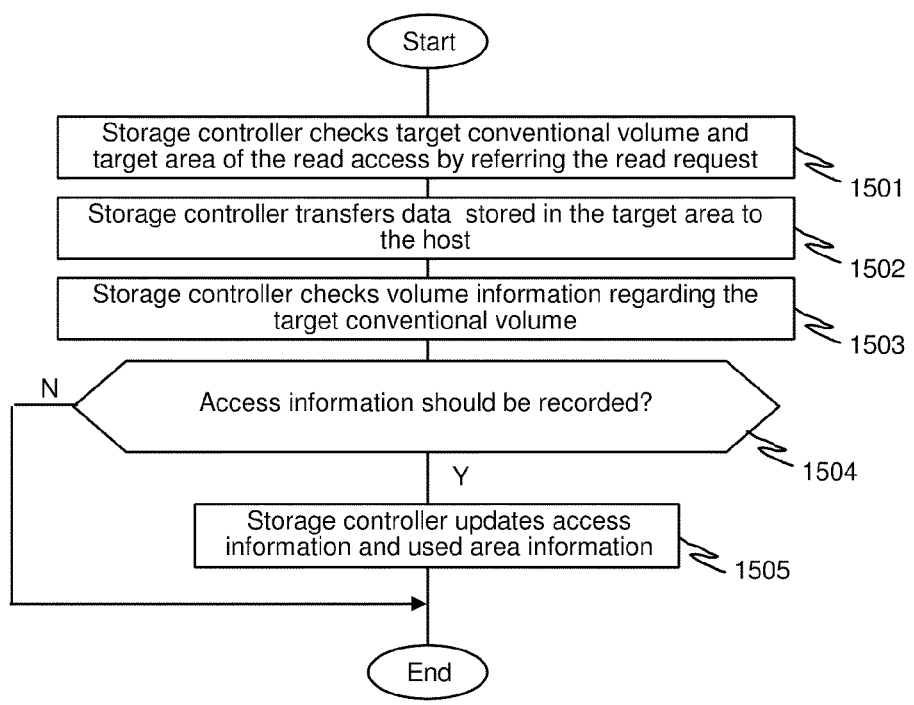
FIG. 15 is an example of a flow diagram illustrating a read process for conventional volume.

FIG. 15 is an example of a flow diagram illustrating a read process for conventional volume 630. At step 1501, the storage controller 110 checks the target conventional volume 630 and the target area of the read access by referring to the read request. At step 1502, the storage controller 110 transfers data stored in the target area of the read access to the host 500. At step 1503, the storage controller 110 checks the record access information flag in the volume information 203. At step 1504, if the flag is "Yes," the process proceeds to step 1505. If not, the process ends. At step 1505, the storage controller 110 updates the access information 204 and used area information 205.

I. Chunk Size Decision Process

Figure 16:
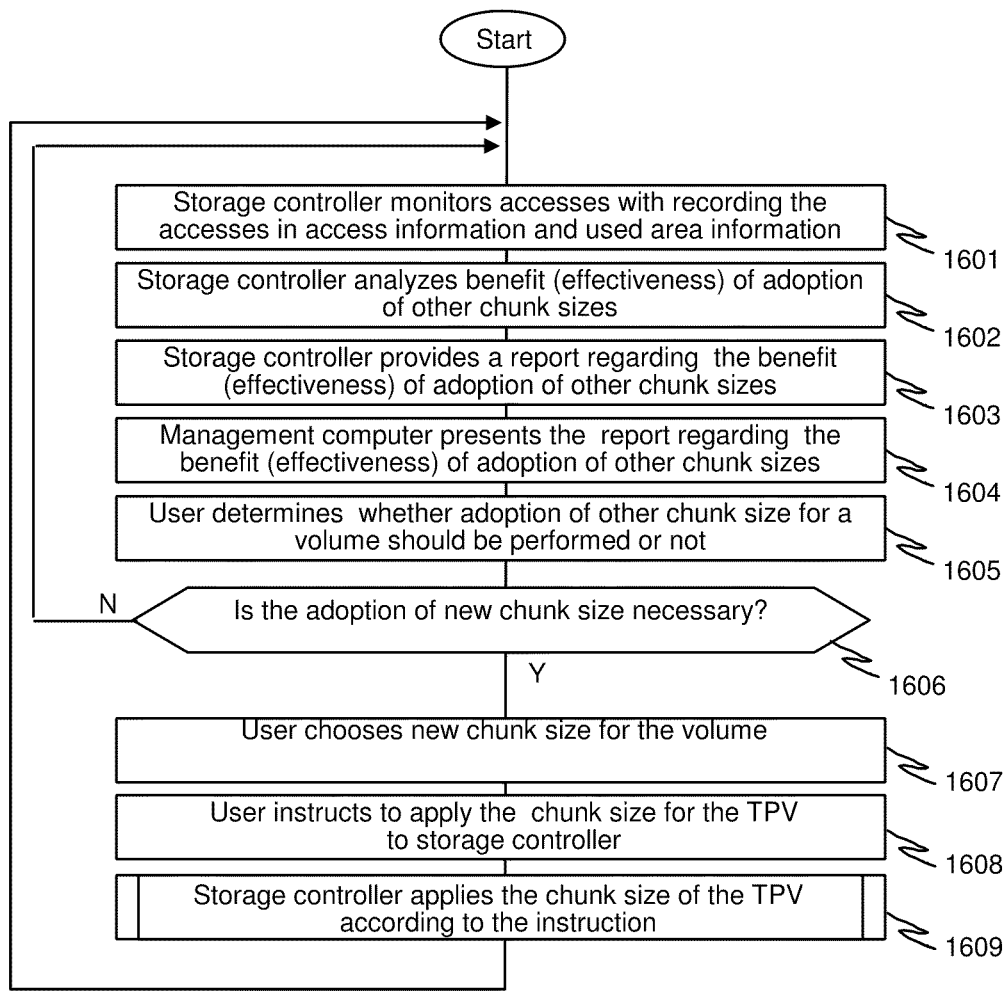
FIG. 16 is an example of a flow diagram illustrating a procedure to determine chunk size.

FIG. 16 is an example of a flow diagram illustrating a procedure to determine chunk size. As described above, at the first step (step 1601), the storage controller 110 monitors accesses for a volume by maintaining and updating the access information 204 and used area information 205. At step 1602, based on the monitoring data, the storage controller 110 analyzes the effectiveness of each option of chunk size. The analysis is achieved based on the monitoring data maintained by the access information 204 and used area information 205. For example, the storage controller 110 evaluates the expected performance with estimation of frequency and overhead of solving relation between virtual area and physical area. The storage controller 110 calculates the overhead based on the access information 204 including the frequency of transcending segment boundary for each segment size. The storage controller 110 also evaluates the expected area usage efficiency in case of each segment size by using the used area information 205. At step 1603, the storage controller 110 makes a report regarding the evaluation mentioned above. At step 1604, the report is transferred and presented to a user via the management computer 520. At step 1605, the user judges the necessity for applying a new chunk size. At step 1606, if the user prefers to apply a new chunk size, the process proceeds to step 1607. Otherwise, the process proceeds to the next evaluation/decision cycle (step 1601). The next cycle is performed with the updated monitoring data (i.e., access information 204 and used area information 205). At step 1607, according to the presented evaluation, the user selects the chunk size to be applied. At step 1608, the user instructs to apply the new (selected) chunk size of the volume to the storage controller 110 via the management computer 520. The management computer 520 issues an instruction to apply the new chunk size to the storage controller 110. At step 1609, the storage controller 110 receives the instruction from the management computer 520 and the storage controller 110 applies the specified chunk size to the volume according to the instruction. Some examples of the process to apply the chunk size or change chunk size to the specified chunk size are described below.

In the above example of the process, the report is presented and the instruction is processed via the management computer 520. However, as another example, these steps may be performed between the user and the storage controller 110 directly.

Regarding execution of the estimation, as another example, the access information 204 and used area information 205 can be transferred to the management computer 520 and the analysis of the access information 204 and the used area information 205 may be performed by the management computer 520 to provide the estimation.

J. Applying New Chunk Size

Figure 17:
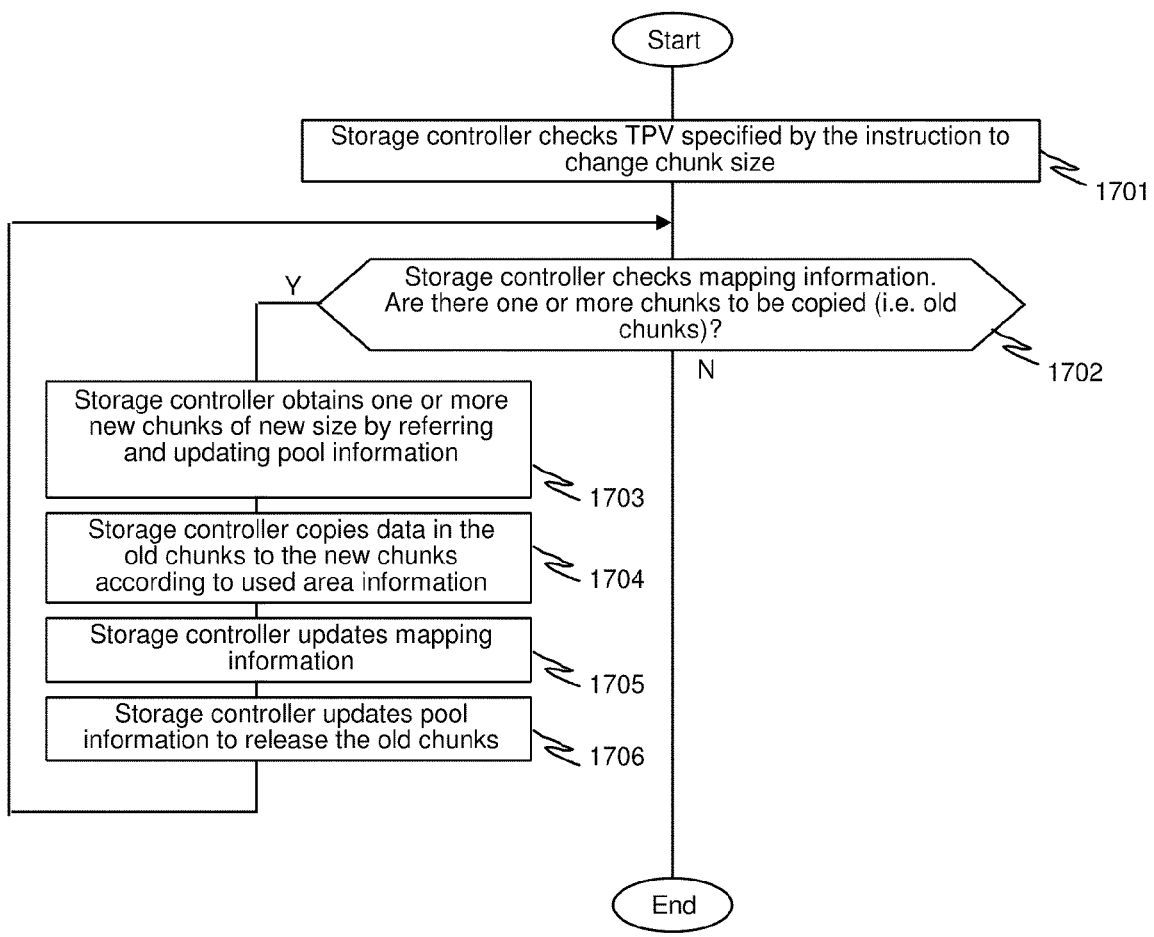
FIG. 17 is an example of a flow diagram illustrating a process to apply a new chunk size.
Figure 20:
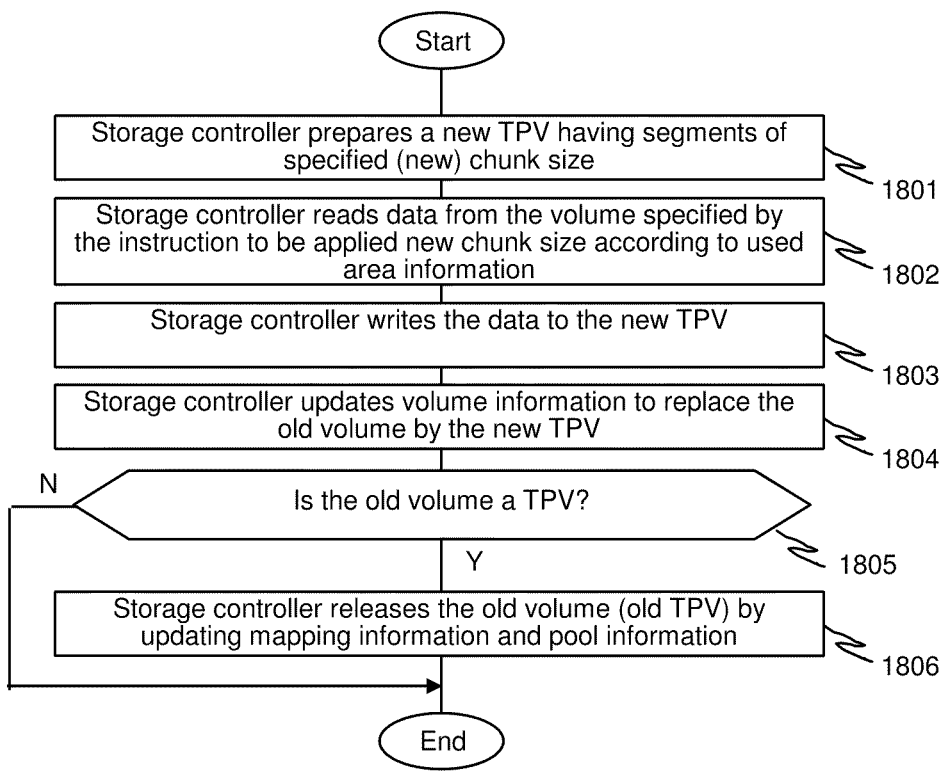
FIG. 20 is another example of a flow diagram illustrating a process to apply a new chunk size.

FIG. 17 and FIG. 20 show examples of a flow diagram illustrating a process to apply a new chunk size mentioned above. In the example shown in FIG. 17, the changing relation denoted by the mapping information 201 is utilized to apply the new chunk size. At step 1701, the storage controller 110 checks the TPV 610 specified by the received instruction for changing the chunk size. At step 1702, the storage controller 110 checks the mapping information 201. If there are one or more chunks to be copied between chunks of different sizes to accomplish changing the chunk size, the process proceeds to step 1703. Otherwise, the process ends. At step 1703, the storage controller 110 secures one or more new chunks of the specified size by referring to and updating the pool information 202. At step 1704, the storage controller 110 copies data in the current (old) chunks to the new chunks according to the used area information 205. At step 1705, the storage controller 110 updates the mapping information 201 to change relation between the TPV 610 and chunks. That is, the storage controller 110 replaces the old chunks with the new chunks in the TPV 610. At step 1706, the storage controller 110 updates the pool information 202 to release the old chunks. Then the process returns to step 1702.

With the above process, the new chunk size is applied to the TPV 610 and the same TPV ID (and volume ID) is used continuously before and after this process.

Figure 18:
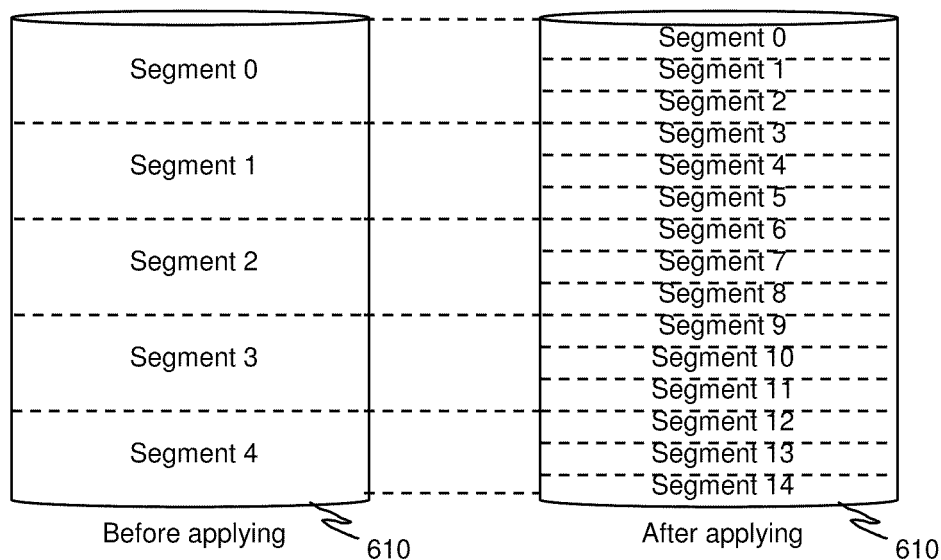
FIG. 18 shows an example of segment (chunk) relation between before and after the process of applying a new chunk size of FIG. 17.
Figure 19:
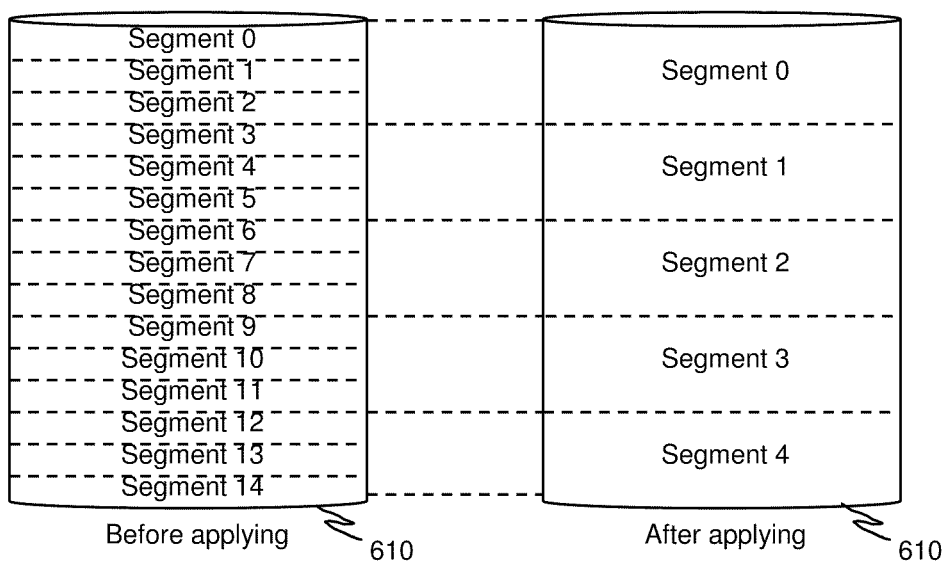
FIG. 19 shows another example of segment (chunk) relation between before and after the process of applying a new chunk size of FIG. 17.

FIG. 18 and FIG. 19 show examples of segment (chunk) relation between before and after the above process of applying a new chunk size of FIG. 17. As shown in these figures, data in one chunk may be copied to multiple new chunks and data in multiple chunks may be copied to one new chunk. In addition, copying data in multiple chunks to multiple new chunks is also possible.

In the example shown in FIG. 20 of a process to apply a new chunk size, a new TPV 610 having a specified segment (chunk) size is used to apply the chunk size, and the volume relation denoted by the volume information 203 is changed to utilize the same volume ID continuously before and after the process. At step 1801, the storage controller 110 obtains a new TPV 610 having a chunk size specified in the aforesaid instruction. At step 1802, the storage controller 110 reads data from the volume specified by the instruction according to the used area information 205. That is, only existing data is read from the volume basically. At step 1803, the storage controller 110 writes the data to the new TPV 610 with maintaining correspondence. In this write process, chunks of the designated size are utilized. At step 1804, the storage controller 110 updates the volume information 203 to change the relation between the volume ID and the volumes. That is, the storage controller 110 replaces the current (old) volumes with the new TPV 610. At step 1805, the storage controller 110 checks whether the old volume is a conventional volume 630 or a TPV 610. If the volume is TPV, the process proceeds to step 1806. If the volume is conventional volume, the process ends. At step 1806, the storage controller 110 releases the old volume (old TPV) by updating the mapping information 201 and pool information 202.

The above process can be used for conversion from a conventional volume to a TPV having the specified segment (chunk) size as well as conversion between TPVs.

In addition to the above examples of a process to apply a new chunk size, as another example, the host 500 or management computer 520 can read data from the specified volume and write the data to a TPV having the designated segment (chunk) size.

K. Another Example of Chunk Size Decision Process

Figure 21:
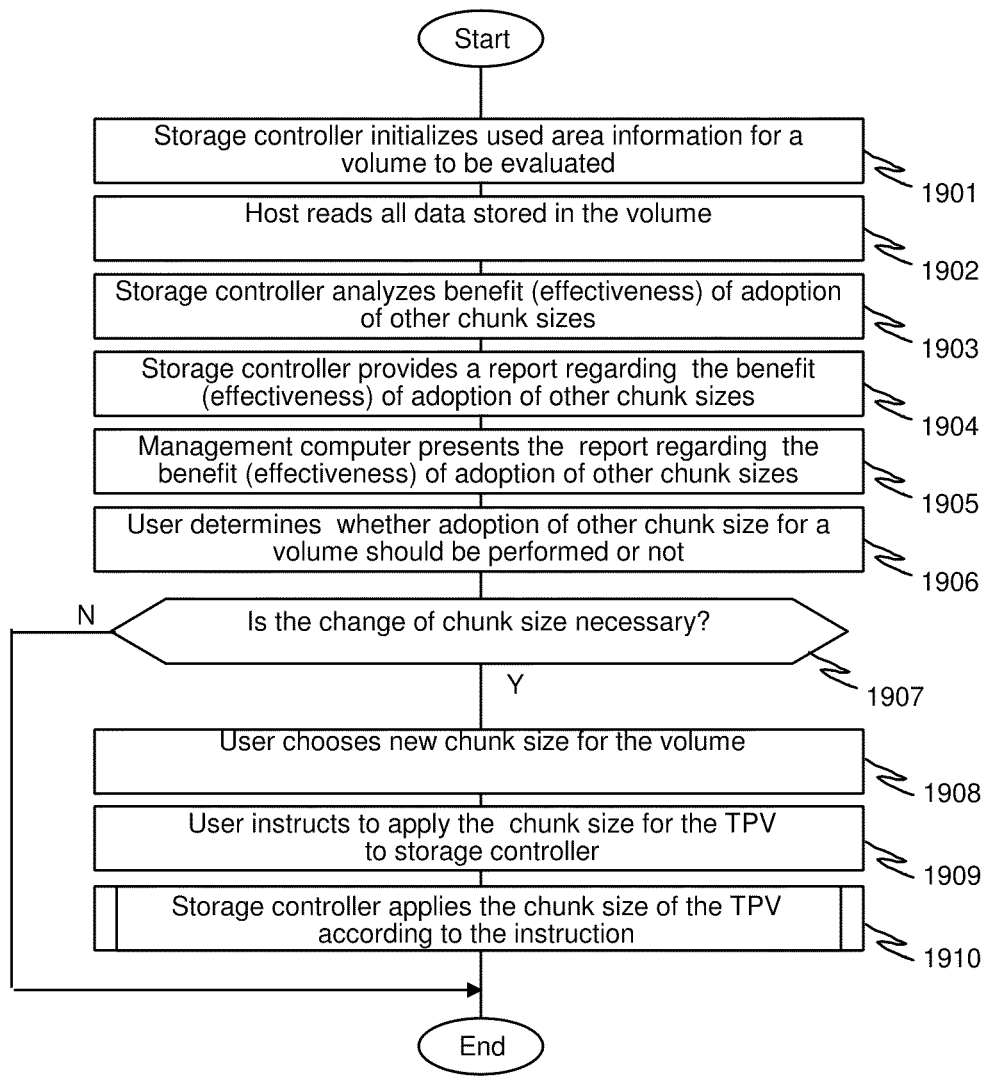
FIG. 21 is another example of a flow diagram illustrating a procedure to determine chunk size.

FIG. 21 is another example of a flow diagram illustrating a procedure to determine chunk size. With the process described below, the effectiveness evaluation to choose the appropriate chunk size can be performed immediately without access monitoring in advance. At step 1901, the storage controller 110 initializes the used area information 205. At step 1902, the agent program 504 on the host 500 reads all data stored in the volume to be evaluated. In the read process, the actual location of existing data in the volume is recorded in the used area information 205. At step 1903, the storage controller 110 analyzes the effectiveness of each option of chunk size. The analysis is achieved based on the used area information 205. The storage controller 110 can evaluate the expected area usage efficiency in case of each segment size by referring to the used area information 205. At step 1904, the storage controller 110 makes a report regarding the evaluation mentioned above. At step 1905, the report is transferred and presented to the user via the management computer 520. At step 1906, the user judges the necessity for applying a new chunk size. At step 1907, if the user prefers to apply a new chunk size, the process proceeds to step 1908. Otherwise, the process ends. Steps 1908, 1909, and 1910 are the same as steps 1607, 1608, and 1609 shown in FIG. 16. The above procedure may be conducted by the management program 523 on the management computer 520.

With the method described above, the benefit/effectiveness of adopting a certain chunk size can be evaluated and presented based on the monitoring data of accesses so that it enables users to choose an appropriate chunk size.

In the above description of processes, the monitoring data composed of access information 204 and used area information 205 is maintained in tabular form. However, as another example of the processes, the monitoring data of accesses can be one or more logs that record accesses for volumes. The monitoring data can be maintained in the disks 600.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for determining the unit size of storage area in a storage system that provides thin provisioned volumes, from viewpoints such as area usage efficiency and performance. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An information system comprising:
   a host computer;
   a management computer; and
   a storage system coupled to the host computer and the management computer, the storage system including a storage controller and a plurality of storage volumes, the storage system being configured to provide thin provisioned volumes from the plurality of storage volumes to the host computer for input/output (I/O);
   wherein each thin provisioned volume includes a plurality of segments which are provided by chunks of the storage volumes in the storage system;
   wherein the storage controller is configured to assign a chunk to a segment on demand;
   wherein the storage controller is configured to analyze effectiveness of different chunk sizes for a chunk to be assigned to a segment and provide a report of the analyzed effectiveness to the management computer; and
   wherein the storage controller is configured to determine a size of a chunk to be assigned to a segment based on input from the management computer after the management computer receives the report of analyzed effectiveness.

2. The information system according to claim 1, wherein the input from the management computer to the storage controller is given by a user who determines whether to change a chunk size based on the report of analyzed effectiveness.

3. The information system according to claim 1, wherein the storage controller is configured to analyze effectiveness of different chunk sizes based on monitoring accesses to the storage volumes and updating access information and used area information for the storage volumes, the access information maintaining information regarding access characteristics of the storage volumes, the used area information identifying used areas and unused areas of the storage volumes.

4. The information system according to claim 3, wherein the access information includes one or more of:

frequency of transcending segment boundary in per unit time for various segment sizes;
access rate per unit time for each read I/O;
access rate per unit time for each write I/O;
average access length for each read I/O; or
average access length for each write I/O.

5. The information system according to claim 1,
wherein the storage controller is configured to analyze effectiveness of different chunk sizes based on used area information for the storage volumes, the used area information identifying used areas and unused areas of the storage volumes.

6. The information system according to claim 1, wherein the storage controller, in response to an instruction to change the chunk size to a new chunk size for a storage volume:
checks mapping information between thin provisioned volumes and corresponding chunks to determine whether there are one or more chunks to be copied between chunks of different sizes to accomplish changing the chunk size; and if yes, then,
secures one or more new chunks of the new chunk size;
copies data in old chunks to the new chunks; and
updates the mapping information.

7. The information system according to claim 1, wherein the storage controller, in response to an instruction to change the chunk size to a new chunk size for a volume:
obtains a new thin provisioned volume having segments with corresponding chunks of a chunk size which is same as the new chunk size;
reads data from the volume specified in the instruction;
writes the read data to the new thin provisioned volume with maintaining correspondence;
updates volume information to change a relation between volumes and volume identifiers by replacing the volume specified in the instruction with the new thin provisioned volume; and
if the volume specified in the instruction is a thin provisioned volume, releases the volume by updating mapping information between thin provisioned volumes and corresponding chunks and pool information for managing whether a chunk is used or not.

8. The information system according to claim 1,
wherein the storage controller is configured to allocate a chunk from the storage volumes to a volume to receive write data in response to a write request so that the allocated chunk is a continuous physical area in the storage volumes.

9. In an information system which includes a host computer; a management computer; and a storage system coupled to the host computer and the management computer, the storage system having a storage controller and a plurality of storage volumes, the storage system being configured to provide thin provisioned volumes from the plurality of storage volumes to the host computer for input/output (I/O), wherein each thin provisioned volume includes a plurality of segments which are provided by chunks of the storage volumes in the storage system, wherein the storage controller is configured to assign a chunk to a segment on demand, a method of managing sizes of the chunks, comprising:
analyzing effectiveness of different chunk sizes for a chunk to be assigned to a segment and providing a report of the analyzed effectiveness to the management computer; and
determining a size of a chunk to be assigned to a segment based on input from the management computer after the management computer receives the report of analyzed effectiveness.

10. The method according to claim 9,
wherein the input from the management computer to the storage controller is given by a user who determines whether to change a chunk size based on the report of analyzed effectiveness.

11. The method according to claim 9,
wherein the effectiveness of different chunk sizes is analyzed based on monitoring accesses to the storage volumes and updating access information and used area information for the storage volumes, the access information maintaining information regarding access characteristics of the storage volumes, the used area information identifying used areas and unused areas of the storage volumes.

12. The method according to claim 11, wherein the access information includes one or more of:
frequency of transcending segment boundary in per unit time for various segment sizes;
access rate per unit time for each read I/O;
access rate per unit time for each write I/O;
average access length for each read I/O; or
average access length for each write I/O.

13. The method according to claim 9,
wherein the effectiveness of different chunk sizes is analyzed based on used area information for the storage volumes, the used area information identifying used areas and unused areas of the storage volumes.

14. The method according to claim 9, further comprising, in response to an instruction to change the chunk size to a new chunk size for a storage volume:
checking mapping information between thin provisioned volumes and corresponding chunks to determine whether there are one or more chunks to be copied between chunks of different sizes to accomplish changing the chunk size; and if yes, then,
securing one or more new chunks of the new chunk size;
copying data in old chunks to the new chunks; and
updating the mapping information.

15. The method according to claim 9, further comprising, in response to an instruction to change the chunk size to a new chunk size for a volume:
obtaining a new thin provisioned volume having segments with corresponding chunks of a chunk size which is same as the new chunk size;
reading data from the volume specified in the instruction;
writing the read data to the new thin provisioned volume with maintaining correspondence;
updating volume information to change a relation between volumes and volume identifiers by replacing the volume specified in the instruction with the new thin provisioned volume; and
if the volume specified in the instruction is a thin provisioned volume, releasing the volume by updating mapping information between thin provisioned volumes and corresponding chunks and pool information for managing whether a chunk is used or not.

16. A non-transient computer-readable storage medium storing a plurality of instructions for controlling a data processor to manage sizes of chunks in an information system which includes a host computer; a management computer; and a storage system coupled to the host computer and the management computer, the storage system having a storage controller and a plurality of storage volumes, the storage system being configured to provide thin provisioned volumes from the plurality of storage volumes to the host computer for input/output (I/O), wherein each thin provisioned volume includes a plurality of segments which are provided by chunks of the storage volumes in the storage system, wherein the storage controller is configured to assign a chunk to a segment on demand, the plurality of instructions comprising:

instructions that cause the data processor to analyze effectiveness of different chunk sizes for a chunk to be assigned to a segment and providing a report of the analyzed effectiveness to the management computer; and instructions that cause the data processor to determine a size of a chunk to be assigned to a segment based on input from the management computer after the management computer receives the report of analyzed effectiveness.

17. The non-transient computer-readable storage medium according to claim 16, wherein the effectiveness of different chunk sizes is analyzed based on monitoring accesses to the storage volumes and updating access information and used area information for the storage volumes, the access information maintaining information regarding access characteristics of the storage volumes, the used area information identifying used areas and unused areas of the storage volumes.

18. The non-transient computer-readable storage medium according to claim 17, wherein the access information includes one or more of:

frequency of transcending segment boundary in per unit time for various segment sizes;

access rate per unit time for each read I/O;

access rate per unit time for each write I/O;

average access length for each read I/O; or average access length for each write I/O.

19. The non-transient computer-readable storage medium according to claim 16, wherein the plurality of instructions further comprise:

instructions that cause the data processor to check mapping information between thin provisioned volumes and corresponding chunks to determine whether there are one or more chunks to be copied between chunks of different sizes to accomplish changing the chunk size; and if yes, then, instructions that cause the data processor to secure one or more new chunks of the new chunk size;

instructions that cause the data processor to copy data in old chunks to the new chunks; and instructions that cause the data processor to update the mapping information.

20. The non-transient computer-readable storage medium according to claim 16, wherein the plurality of instructions further comprise, in response to an instruction to change the chunk size to a new chunk size for a volume:

instructions that cause the data processor to obtain a new thin provisioned volume having segments with corresponding chunks of a chunk size which is same as the new chunk size;

instructions that cause the data processor to read data from the volume specified in the instruction;

instructions that cause the data processor to write the read data to the new thin provisioned volume with maintaining correspondence;

instructions that cause the data processor to update volume information to change a relation between volumes and volume identifiers by replacing the volume specified in the instruction with the new thin provisioned volume; and instructions that cause the data processor to, if the volume specified in the instruction is a thin provisioned volume, release the volume by updating mapping information between thin provisioned volumes and corresponding chunks and pool information for managing whether a chunk is used or not.

\* \* \* \* \*